Dec. 1, 1953  E. H. LAND  2,661,292
PRODUCT FOR DISPENSING A LIQUID-COATED SHEET
Filed Feb. 19, 1947  2 Sheets-Sheet 1

INVENTOR
Edwin H. Land
BY Donald L. Brown
Attorney

Dec. 1, 1953  E. H. LAND  2,661,292
PRODUCT FOR DISPENSING A LIQUID-COATED SHEET
Filed Feb. 19, 1947  2 Sheets-Sheet 2

INVENTOR
Edwin H. Land
BY
Donald L. Brown
Attorney

Patented Dec. 1, 1953

2,661,292

UNITED STATES PATENT OFFICE 2,661,292

PRODUCT FOR DISPENSING A LIQUID-COATED SHEET

Edwin H. Land, Cambridge, Mass., assignor to Polaroid Corporation, Cambridge, Mass., a corporation of Delaware Application February 19, 1947, Serial No. 729,580

25 Claims. (Cl. 95—8)

This invention relates to photography and more particularly to novel photographic products.

A principal object of the present invention is to provide novel photographic products particularly adapted for the production, in a camera apparatus, of a positive image of a subject image.

Another object of the invention is to provide such products which are cheap to manufacture and simple to use.

These and other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

This invention relates generally to the production of visible images from photographically exposed photosensitive material. In one preferred form of the invention the photosensitive material is a silver halide and the product incorporating a sheet of the silver halide includes a permanent meniscus of a processing liquid reagent held in a protective environment, a portion of the sheet being normally in contact with the liquid and adapted, upon movement out of contact with the bulk of the liquid, to have left on its surface a predetermined film of the liquid. In a preferred form of the invention the protective environment for the liquid controls the thickness of the liquid film. In another form of the invention the sheet of photosensitive material and a sheet of another material are fed past a protective environment for a bulk of the liquid and a predetermined film of the liquid is applied to the surface of one or both of the two sheets. The protective environment preferably has associated therewith a means for pressing the two sheets together for the purpose of laminating them by means of the spread liquid and in a preferred form of the invention the means is within the protective environment and the sheets are both in contact with the liquid and are laminated together within and by means of the protective environment. The liquid reagent is preferably one capable of reacting with the photosensitive layer to create a differential visible effect therein which is a function of the degree of exposure of said layer. When two layers are employed the liquid may develop a negative in the photosensitive layer and concurrently form a positive on the other layer.

Figure 1:
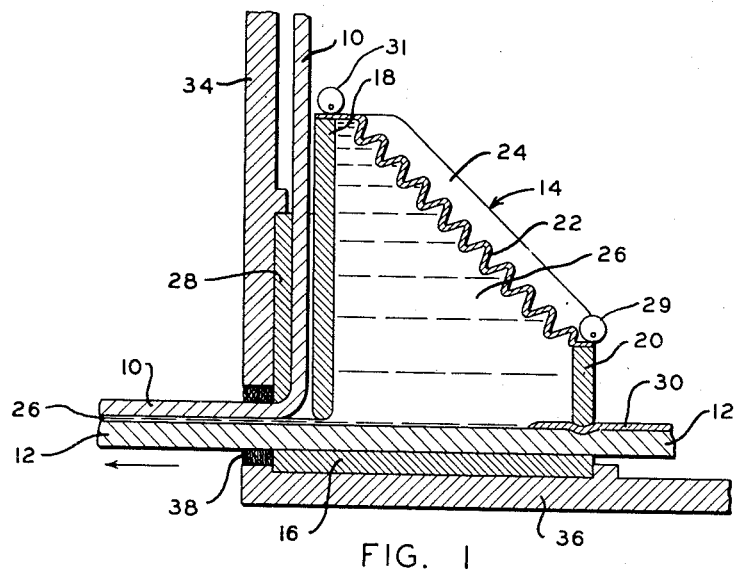
Figure 1 is a diagrammatic sectional view of one form of the invention.

Referring now to Fig. 1 there is shown a diagrammatic sectional view of one form of the invention. In this figure there is provided a layer 10 which may be a photosensitive layer, for example of silver halide. There is also provided another layer 12 which may, in a preferred form of the invention, comprise a layer adapted to have formed on its surface a positive image of a latent negative image created in said photosensitive layer as the result of exposure of said photosensitive layer to actinic light modified by a subject image. For confining a liquid processing reagent within a protective environment there is provided a processing container generally indicated at 14. This container comprises a bottom wall 16, a front wall 18, a rear wall 20, a flexible top wall 22 and side walls 24. The liquid reagent is preferably a viscous solution of a reactive ingredient capable of accomplishing the desired processing of the photosensitive layer. The container also has an additional member 28 associated therewith which is adapted to cooperate with the bottom wall 16 of the container in laminating layers 10 and 12 together.

The container as described above is capable of holding a predetermined quantity of liquid in an environment protected from ingress of oxygen or egress of the liquid or its vapors. It can apply a thin film of liquid to layer 12 and can laminate layers 10 and 12 together by means of the liquid.

In order to assist in performing the above functions the container is preferably designed so that the entrance side of the container is somewhat smaller than the exit side. Thus in Fig. 1 the distance between the bottom of wall 18 and bottom wall 16 is slightly greater than the distance between the bottom of wall 20 and bottom wall 16.

With some types of materials used in the above processing there is considerable interaction between the liquid and the substances included in the surface of the layers. For example, if the layer 12 is a photosensitive layer, liquid composition 26 may include a silver halide solvent. If layer 12 is left in contact with this liquid for a considerable length of time, the liquid dissolves the silver halide, thereby contaminating the liquid 26. It is preferred therefore, in most cases where one of the layers is to remain in contact with the bulk of the liquid, that the portion of the layer which is to be contacted by the liquid during times when the apparatus is not being used have applied to its surface an impermeable coating which prevents permeation of the layer by the liquid, thereby preventing this interaction. This coating is shown at 30 in Fig. 1 and may comprise a coating such as a wax, metal foil, or a plastic such as polyvinyl butyral and other materials which are inert to and are impermeable to the liquid. This coating is preferably made slightly longer than the distance between the entrance and exits of the container, so that the increased thickness imparted to the layer by the presence of this coating extends through both the entrance and exit, thereby effectively plugging the entrance and exit to prevent escape of the liquid or its vapors, or the entrance of oxygen. Where the layer is permeable to the liquid 26 the layer may be impregnated with the coating material such as wax. The coating may also be applied to both sides of the sheet as well as to just one side, this being preferred in some cases.

The container 14 of Fig. 1 is shown mounted in a processing apparatus which may, for example, be a camera having a back wall 34 to which is hinged a bottom wall 36, the juncture between these two walls being a light-sealed opening 38. The camera preferably has suitable means for holding the container fixed against movement. Either of the layers 10 or 12 may be the photosensitive layer.

In some cases it may be desirable to apply a high compression to the walls of the container for the purpose of clamping these walls tightly against the sheet extending through the entrance and exit openings of the container. For this purpose the apparatus in which the container is positioned has suitable clamps, at least one of which is movable to decrease the size of the openings through which the paper extends. This feature of the invention is shown in Fig. 1 where clamp members 29 and 31 are mounted in the camera apparatus, these members being movable towards the bottom 36 of the camera. These members are shown as eccentric rods bearing on the top surfaces of walls 20 and 18 respectively, these rods being shown in a position where they are not exerting a sealing pressure. They may take many other forms and be actuated in a number of ways. In one preferred form of camera apparatus these eccentric rods are actuated from outside the camera while in another form they are actuated as the result of closing the camera preparatory to storage.

In the use of the invention as shown above, the photosensitive layer, which may be layer 10, is exposed to a subject image and those portions of layers 10 and 12 extending outside of the camera through the light-seal opening 38 are pulled a predetermined amount. This applies a thin film of the liquid 26 to the surface of the layer 12. Member 28, in cooperation with the bottom wall 16 of the container, laminates these two layers together. When these two layers have opaque outer surfaces, they form a light-tight sandwich within which a desired processing may be accomplished. This processing may be the development of a positive image in layer 10, if that layer is a diazonium photosensitive material, or if the layer 10 is a standard silver halide photosensitive material, the liquid reagent may develop a negative image therein and it may also fix the negative image. In a preferred form of the invention the liquid also creates a positive image of the negative image on the surface of layer 12. If such a positive image is desired, a liquid composition 26 is preferably formed as set forth in the following nonlimiting example:

*Example 1*

| | Grams |
|---|---|
| Water | 1860 |
| Sodium carboxymethyl cellulose | 93 |
| Sodium sulfite | 78 |
| Sodium hydroxide | 74.6 |
| Sodium thiosulfate | 14.5 |
| Citric acid | 38.5 |
| Hydroquinone | 52.0 |

With such a liquid composition and a fast silver halide photosensitive film such as Ansco "Triple S Pan," and Kodak "Verichrome," the layer 12 is preferably treated as set forth in the following non-limiting example:

*Example 2*

A sheet of baryta paper is thoroughly wetted with water and run through a $\frac{1}{6}\%$ aqueous solution of neutral lead acetate for 45 seconds. The sheet is then squeegeed and run through a $\frac{1}{12}\%$ aqueous solution of sodium sulfide solution for 3-4 seconds.

It can be seen from the above description of the operation of the invention that the liquid is gradually drawn out of the container 14. Several walls of the container are preferably made flexible so as to allow these walls to collapse, thus preventing creation of a vacuum within the container which might interfere with the distribution of the liquid in a uniform coat on the surface of the layer being drawn past the bulk of the liquid. In some cases it may be desirable to apply a positive spring pressure upon the liquid such as by having a spring bearing upon one of the flexible walls or by making these flexible walls of a springy material such as metal, these walls being under deflection when the container is full. Too high a pressure on the liquid, however, may be undesirable due to its possible effect of increasing the difficulty of sealing the entrance and exit of the container.

The liquid composition is preferably quite viscous and preferably has included therein a film-forming material which has the characteristic of being relatively impermeable to oxygen, thus making the whole bulk of layer 26 relatively impermeable to oxygen. This is particularly advantageous since the viscous fluid which exists in the openings acts as quite an effective oxygen seal for these openings, particularly if the liquid is viscous enough so that it does not tend to cold flow to any appreciable extent.

In filling the container 14, the layer 12 is preferably positioned therein to close the bottom of the container, then a predetermined amount of the viscous liquid is forced into the container such as by the use of a syringe through an opening (not shown), the air in the container being permitted to escape through another opening (not shown). If desired the container may be first purged with an inert gas such as nitrogen. This is not necessary if the liquid composition is of the type described above and if the container is completely filled by the liquid so that no oxygen remains therein. The filling opening and the air vent may comprise heat-sealable plastic nipples which can be permanently sealed immediately after the filling operation.

Figure 2:
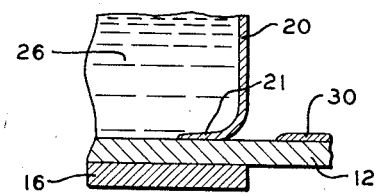
Fig. 2 is a diagrammatic sectional view of another form of the invention of Fig. 1.

Referring now to Fig. 2 there is shown another modification of the invention where like numbers correspond to like elements of Fig. 1. Fig. 2 is a fragmentary sectional view of another modification of the right-hand portion of Fig. 1. In this modification, the rear wall 20 is inwardly curved so as to comprise a springy lip 21 adapted to bear against the surface of layer 12. This lip 21 is preferably so formed that it is deflected from its normal position by layer 12 being positioned therebelow. This lip 21 therefore bears quite strongly against the surface of layer 12 and has the additional advantage that any fluid pressure in the liquid forces the lip 21 tighter against the layer 12. When a portion of layer 12 having a coating strip 30 thereon passes under lip 21, the pressure between the lip and coating 30 is increased even more, thus insuring a tight seal during the times when layer 12 is motionless. This modification of the invention is particularly suitable in those cases where it is desired to have positive pressure on the liquid 26.

Figure 3:
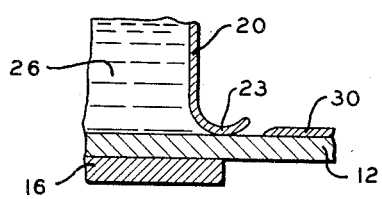
Fig. 3 is a diagrammatic sectional view of another form of the invention of Fig. 1.

Referring now to Fig. 3, there is shown still another modification of the invention wherein like numbers correspond to like elements of Figs. 1 and 2. Fig. 3 is a fragmentary sectional diagrammatic view of a portion of a right-hand portion of Fig. 1. In this case the lower portion of rear wall 20 is bent outwardly to form a springy lip 23 which bears tightly against the surface of layer 12, thus giving an excellent seal between this lip and the surface of the layer. This feature of the invention is generally similar in operation to the modification described in connection with the discussion of Fig. 1 above, and is particularly useful where a means, such as eccentric rod 29, is provided in the camera for squeezing the entrance and exit openings tightly shut.

Figure 4:
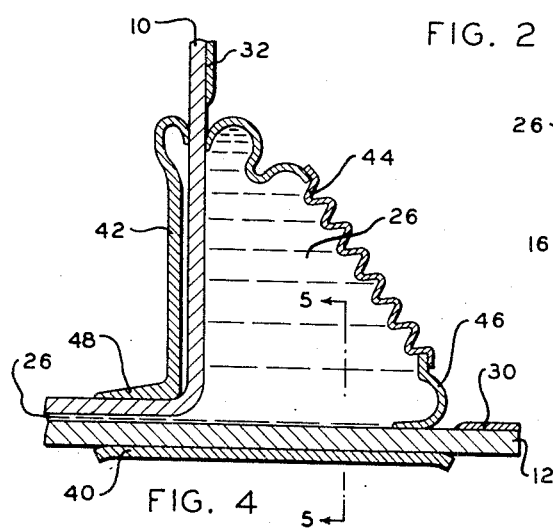
Fig. 4 is a sectional diagrammatic view of still another form of the invention.
Figure 5:
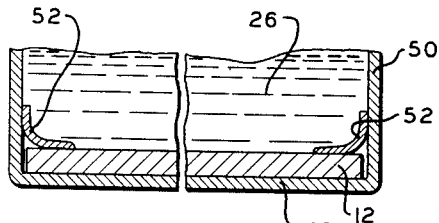
Fig. 5 is a fragmentary sectional view of Fig. 4 taken along the line 5—5.

Referring now to Figs. 4 and 5, there is shown a modification of the invention wherein both layers pass in contact with the fluid in the container and are laminated together while within the protective environment. In these figures like numbers correspond to like elements in the previous figures. Fig. 4 is a diagrammatic sectional view while Fig. 5 is a fragmentary sectional view of Fig. 4 taken along the line 5—5. The layers 10 and 12 may be negative and positive layers respectively or one may be a photosensitive layer and the other may be only a light-proof covering layer. Portions of these layers may have impermeable coatings 30 and 32 applied thereto.

The container preferably comprises a bottom wall 40, a front wall 42, a back wall 46 and a flexible top wall 44. These walls are preferably made springy so that the portions of the walls defining openings therebetween resiliently engage the layers passing through these openings. As shown, the portions defining the entrance openings for the layers are preferably bent inwardly so that any pressure of the liquid tends to force these portions tightly against the surface of the sheet. That portion 48 of the front wall 42 which, in cooperation with the bottom wall 40, forms the discharge opening for the two layers, is preferably quite rigid so as to form a relatively fixed gap which, in some cases, gives a more accurate control of the thickness of the liquid layer. The rigidity of portion 48 may be partially furnished by the apparatus in which the container is used. This lip may be flexible, however, if extreme accuracy of spread is not desired over a wide range of speeds of movement of the layers. When the portions of the two layers having the coatings 30 and 32 thereon enter the fixed exit gap the two coatings 30, 32 are forced into intimate contact and are compressed, thus forming an excellent seal for the exit from the container. The side of the two layers may be sealed by providing suitable seals such as those shown at 52 in Fig. 5. These are preferably extensions of rear wall 46 and are preferably springy so as to engage tightly the edges of the layer 12, for example, to prevent side leakage of the liquid. Similar seals may be provided for layer 10. Other side seals such as pieces of springy plastic may be equally provided. The container of Figs. 4 and 5 may be filled in the same manner as the container of Fig. 1, and the liquid 26 may comprise a liquid similar to that of Example 1. The modification of Figs. 4 and 5 has the added advantage that no air can contact the processing film of spread liquid and it is therefore free from oxidation and the formation of bubbles.

In some cases, where the composite product, comprising one or two layers and a fluid, are to be stored for a considerable time before use, it may be desirable to have the liquid hermetically sealed within the protective environment out of contact with the layer extending through the protective environment, the liquid being releasable for contact with the layer within the protective environment before, or as the result of, use of the product. This feature of the invention is shown in Figs. 6 through 8a, wherein like numbers correspond to like elements in the preceding figures.

Figure 6:
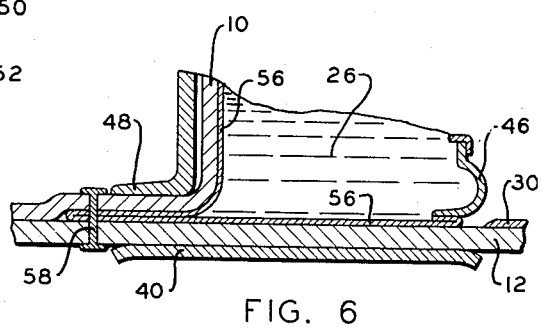
Fig. 6 is a sectional fragmentary view of another modification of the invention of Fig. 4.

Referring now to Fig. 6 there is shown a diagrammatic sectional view of a product similar to that of Fig. 5. In Fig. 6 there is provided a barrier layer 56 which is heat-sealed, or otherwise secured to the walls of the container so as to separate the fluid from the layers extending through the container. As shown, a portion of this barrier preferably extends between the two layers and is preferably secured thereto, as by means of a rivet 58. Thus, when layers 10 and 12 are pulled, the barrier layer 56 is torn loose from the rest of the container and allows the liquid to contact the surface of succeeding portions of layers 10 and 12. This barrier layer may conveniently be formed of a paper-backed metal foil which is lined with an inert plastic.

Figure 7:
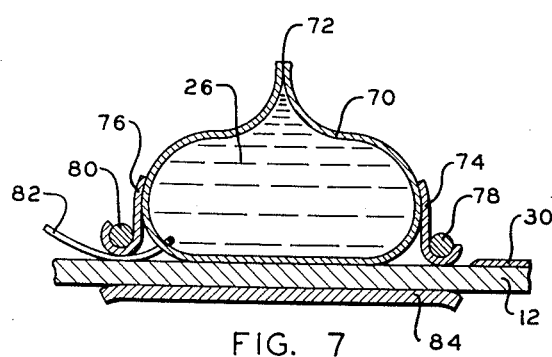
Fig. 7 is a sectional diagrammatic view of still another form of the invention.

Referring now to Fig. 7 there is shown a diagrammatic sectional view of still another form of the invention. In this case the initial liquid confining portion of the protective container is formed of a flexible water-vapor and oxygen impervious material. The other portions of the protective container, adapted to receive a layer of material to which the liquid is to be applied, are secured to the liquid confining portion. This liquid confining portion is preferably formed of a sheet 70 of a paper-backed metal foil coated on its inner surface with a heat-sealable plastic such as polyvinyl butyral. This sheet 70 is folded along a medial line, the ends and edge 72 of the sheet being sealed as it is filled with the liquid. Back wall 74 and front wall 76, as well as side walls (not shown), are preferably sealed to the sheet 70 prior to the filling operation. These walls 74, 76 are then secured to rigid members 78 and 80, respectively, these latter members defining, in conjunction with a bottom wall 84, an entrance and exit from the protective environment. Suitable end walls, which may be integral with bottom wall 84 are also provided. The entrance and exit openings have the same functions as those of the previous figures. For releasing the liquid 26 from its initially confined space for permitting it to flow into contact with layer 12, there is provided a severing means such as a string 82 which passes through the sheet 70 and which, upon pulling, severs sheet 70 along its length. This string can for example be secured to layer 12 so that movement of layer 12 will render the severing means operative.

A method of forming a positive image with the modification of Fig. 7 is set forth below.

*Example 3*

In this case the photosensitive layer 12 is a sheet of paper which is dipped in a saturated water solution of Du Pont naphthanil Diazo Black B. The liquid 26 comprises a small amount of a solution containing 1500 cc. of a 5% water solution of sodium carboxymethyl cellulose to which 10 grams of resorcinol and 1 gram of sodium hydroxide are added. The modification of Example 3 gives a positive dye image upon exposure to strong actinic light through a positive and spreading of the liquid 26 across its surface.

Figure 8A:
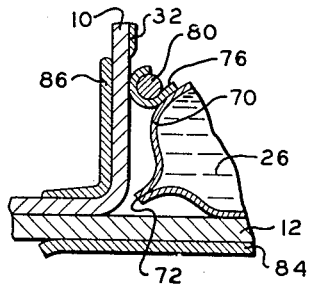
Fig. 8a is a sectional fragmentary diagrammatic view of a modification of the invention of Fig. 8.
Figure 8:
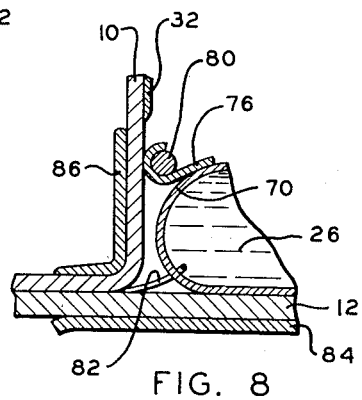
Fig. 8 is a fragmentary diagrammatic view of a modification of the invention of Fig. 7.

In Fig. 8 there is shown a modification of the invention similar to Fig. 7 but wherein the protective environment has two layers passing therethrough and is adapted to laminate these layers together. In this Fig. 8 there is provided an additional front wall 86, which defines, with member 80, an entrance opening, and with member 84 an exit. When the severing member 82 is pulled it allows the liquid 26 to contact the two layers 10 and 12. It is also possible in the modifications of Figs. 7 and 8 to include on the surface of layer 12 (of Fig. 7) or layer 10 or 12 (of Fig. 8) a severing means such as a number of thumb tacks which are adapted to puncture and rip open the bottom of sheet 70 as the layer moves initially, thereby allowing the liquid 26 to contact the remainder of the layer or layers within the protective environment.

In Fig. 8a there is shown another modification of the invention of Fig. 8, which can be equally applied to the other figures of the invention. In this form there is provided a sealed liquid confining portion 70 having a seal 72, positioned within the protective environment. This seal 72 is so designed that it may be ruptured when a compressive force is applied to the confined liquid 26 to increase the hydraulic pressure within the liquid. This seal is preferably formed by placing a strip of ethyl cellulose over the polyvinyl butyral lining along the edge 72, this ethyl cellulose giving a weaker seal than the seal created at the ends of the container by heat-sealing the polyvinyl butyral to itself. This pressure on the confined liquid may be created by squeegeeing the assembly before inserting in the apparatus, or as the result of inserting in the apparatus, or by means of a pressure member in the apparatus. The modifications of the invention of Figs. 7–8a may be changed in accordance with suggestions made during the discussion of Figs. 1–6.

The materials from which the various portions of the containers of the various figures may be made are of many types. The various portions can be formed of metal, paper, plastics, etc. where these materials have the necessary structural strength, impermeability and inertness for the particular use to which these portions are put. While preferred forms of containers have been shown, many other types are within the scope of the present invention, the figures being representative of the specific forms of the invention. For example, when two layers pass through the liquid-bearing portion of the container the angle at which they meet may be considerably changed from the 90 degree angle shown in Fig. 4, for instance, and this angle may be quite small, such as 15 or 20 degrees.

Figure 9:
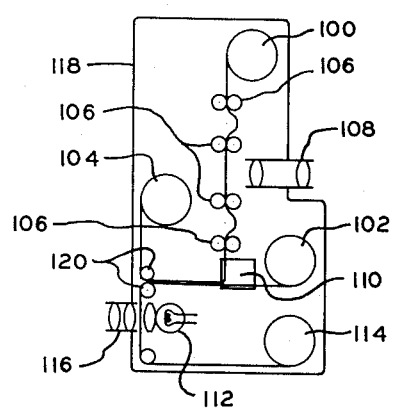
Fig. 9 is a schematic view of one form of apparatus embodying the present invention.

There is shown in Fig. 9 one type of apparatus with which the product of the present invention is particularly useful. This figure is a diagrammatic schematic view of photographic apparatus such as a movie camera and in particular a camera for use as an infrared viewer for night vision or vision through fog or clouds. As shown, there is provided a roll 100 of photosensitive material, preferably an infrared sensitive silver halide emulsion coated on a paper base. There is also provided a roll 102 of positive sheet which is preferably a strip of transparent material such as gelatin which has been treated, for example in a bath of the type described in Example 2. A take-up spool 104 may be provided for processed portions of the photosensitive film 100. For intermittently feeding successive frames of exposed film 100 past a lens system 108 there is provided a suitable series of sprockets or rolls 106. A container 110 is suitably secured to the two sheets and held in the camera. This container is diagrammatically shown and may take the form of any of Figs. 1–8a, it being preferred, however, that both layers 100 and 102 pass through the protective environment of the container and contact the liquid held thereby. The lamination, formed by the passage of the two layers through container 110, is allowed to exist as such for a few seconds during which time the latent negative image is developed in layer 100 and a positive image is formed on the surface of layer 102. These layers are then separated by rolls 120 and the positive image layer 102 is fed past a light source 112 which directs light, modified by the positive, through a lens system 116 where it may be viewed by the user of the camera. The positive layer, after viewing, is rolled up on roll 114.

The apparatus of Fig. 9 is thus of great utility to the field of transportation wherein it is desired to look through fog or darkness so that those in control of an airplane, ship, etc. may quickly ascertain their position with respect to objects otherwise not visible. While the camera apparatus of Fig. 9 is preferably designed for processing a silver halide photosensitive film to obtain a positive image it may only process the film to obtain a negative which may be fixed or unfixed, in the latter case the residual silver halide being preferably desensitized. This modification of the invention is particularly useful when the invention is to be used for modulating a television transmitter cathode ray tube.

From the above description of the invention, it can be seen that it is of extremely wide application. It can be used with all types of photosensitive materials such, for example, as diazonium, silver halide, lead halides and azides, ferric salts, bichromates and others. These photosensitive materials may range in sensitivity from the slowest, such as the bichromates, to the fastest, such as silver bromiodide. Their spectral response may range from radiations of less than 1 angstrom, such as alpha and gamma rays, to the infrared.

The invention may be used for obtaining negative images in the photosensitive layer or on another layer. Positive images may be obtained in the photosensitive layer, in the formed film from the liquid, or in the surface of another layer.

While the various reactive ingredients of the reagent are preferably included in the liquid composition, they may be included in an inert state in the photosensitive or other layers processed. In this case the liquid reagent may only comprise a solvent for the reactive ingredients and preferably a viscosity-increasing material to assist in controlling the spreading of the reagent. It is equally possible to include part of the active ingredients in the liquid and part on the layer or layers to be processed.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A composite product for dispensing a pair of superposed sheet materials having a film of liquid therebetween, said product comprising, in combination, a disposable housing providing a chamber for containing a liquid, liquid contained within said chamber, means providing an ingress passage from the exterior of said housing into said chamber, means providing an egress passage from the interior of said chamber to the exterior of said housing, a first sheet material threaded through said passages so that a portion of the length of said sheet material is contained within said chamber, a leading portion of said sheet material projecting from said egress passage externally of said housing, a trailing portion of said sheet material projecting from said ingress passage, means providing a second ingress passage from the exterior of said housing into said chamber, a second sheet material extending into said chamber through said second ingress passage and out of said chamber through said egress passage in superposed relation with said first sheet material, the entire mass of liquid in said chamber being contained between the adjacent inner surfaces of said sheet materials, and sealing means for preventing flow of said liquid through said egress passage, movement of said sheet materials being effective, when said sealing means is rendered inoperative, to form a film of said liquid between said materials as the latter are withdrawn from said chamber through said egress passage.

2. The product of claim 1 which comprises means within said chamber engaging the full lengths of the portions of the sheet materials in said chamber, said last-named means extending from said ingress passages to said egress passage and cooperating with said sheet materials to guide said sheet materials through said chamber and to render only one of the two surfaces of each said sheet material available for direct contact with the liquid in said chamber, said surfaces for contacting said liquid being the surfaces of said sheet materials which face one another as said sheet materials are withdrawn from said egress passage.

3. The product of claim 1 wherein said sealing means is a strip of material located in the egress passage.

4. The product of claim 3 wherein said sealing strip is mounted upon one of said sheet materials and the latter sheet material is accessible from the exterior of said housing for rendering the sealing means inoperative.

5. The product of claim 1 wherein said sealing means comprises means for forming a separate liquid-containing compartment within said chamber which excludes the sheet materials and means for releasing the liquid from said compartment to fill the portion of said chamber which includes said sheet materials so that movement of said sheet materials, subsequent to said liquid release, produces a film of the liquid between said sheet materials.

6. The product of claim 5 wherein said compartment includes a rupturable liquid-tight membrane as one wall thereof and wherein the means for releasing the liquid comprises an element for rupturing said membrane, said element being connected to said membrane and to one of said sheet materials so that movement of said sheet materials automatically ruptures said membrane.

7. The product of claim 1 wherein a portion at least of one wall of the chamber is movable relative to the other walls and capable of collapsing inwardly to compensate for pressure differences due to the withdrawal of liquid from said chamber.

8. The product of claim 1 wherein one of said sheet materials includes a photographic, photosensitive portion capable of having an image formed therein upon photoexposure and said product contains material including a photographic reagent for producing a transformation of an image in said photosensitive portion, the liquid, when applied to said photosensitive portion, rendering said transforming material effective to transform an image in said photosensitive portion.

9. The product of claim 8 wherein the photosensitive portion is a silver halide emulsion and the photographic reagent is a silver halide developer.

10. The product of claim 9 wherein the transforming material also includes a silver halide solvent and the image transformation performed thereby includes the creation of a transfer print on said second sheet material.

11. A composite product for dispensing a pair of superposed sheet materials having a film of liquid therebetween, said product comprising, in combination, a disposable housing providing a chamber for containing a liquid, liquid contained within said chamber, means providing an ingress passage and an egress passage in the walls of said chamber, an elongated sheet material, approximately as wide as said passages are long, threaded through said passages so that a portion of the length of said sheet material is contained within said chamber, a leading portion of said sheet material extending from said egress passage, another portion of said sheet material, substantially longer than said leading portion, trailing said ingress passage, sealing means within said chamber for confining the liquid to said chamber, said sheet material being movably mounted within said passages so that said sheet material may be drawn through said chamber by pulling said leading portion, means for rendering said sealing means inoperative, a film of said liquid being applied to said sheet material as the latter moves out of said chamber when said sealing means is inoperative, guide means on the exterior of said chamber, said guide means terminating adjacent the egress passage from said chamber, and a second sheet material slidably mounted in said guide means so that a leading portion of said second sheet material is superposed on the leading portion of said first-named sheet material, said second-named material being movable in superposed relation with said first-named sheet material as the latter is drawn from said chamber, the film of liquid being located between said sheet materials.

12. The product of claim 11 wherein said sealing means comprises a strip located in said egress passage and secured to one of said sheet materials so as to be movable therewith, the latter sheet material constituting the means for rendering said sealing means inoperative.

13. The product of claim 11 wherein said sealing means provides a liquid-containing compartment within said chamber separate from the portion of said chamber through which said first sheet material is threaded, said sealing means including a rupturable membrane and said means for rendering said sealing means inoperative comprising an element for rupturing said membrane.

14. The product of claim 11 wherein a portion at least of one wall of the chamber is movable relative to the other walls and capable of collapsing inwardly to compensate for pressure differences due to the withdrawal of liquid from said chamber.

15. The product of claim 11 wherein one of said sheet materials includes a photographic, photosensitive portion capable of having an image formed therein upon photoexposure and said product contains material, including a photographic reagent, for producing a transformation of an image in said photosensitive portion, the liquid, when applied to said photosensitive portion, rendering said transforming material effective to transform an image in said photosensitive portion.

16. The product of claim 15 wherein the photosensitive portion is a silver halide emulsion and the photographic reagent is a silver halide developer.

17. The product of claim 16 wherein the transforming material also includes a silver halide solvent and the image transformation performed thereby includes the creation of a transfer print on said second sheet material.

18. A composite product for dispensing a liquid-coated sheet material, said product comprising, in combination, a disposable housing providing a chamber for containing a liquid, means providing an ingress passage from the exterior of said housing into said chamber, means providing an egress passage from the interior of said chamber to the exterior of said housing, an elongated sheet material threaded through said passages so that a portion of the length of said sheet material is contained within said chamber, a leading portion of said sheet material projecting from said egress passage externally of said housing, a trailing portion of said sheet material projecting from said ingress passage, means within said chamber engaging the entire length of the portion of said sheet material in said chamber, said last-named means extending from said ingress passage to said egress passage and cooperating with said sheet material to guide said sheet material through said chamber and to render one of the two surfaces of said sheet material available for direct contact with liquid in said chamber while preventing such liquid from reaching the other of said surfaces, a liquid contained within said chamber and in direct contact with said one surface of said sheet material, and a sealing strip attached to said sheet material at said egress passage so as to increase the effective thickness of the materials in said egress passage and thereby cooperate with the walls of said egress passage to provide a liquid-tight seal, said sealing strip covering only a portion of the length of said sheet material, said sheet material being movable within said passages so that withdrawal of said sheet material from the egress passage moves said sealing strip beyond the egress passage and causes the liquid in said chamber to be dispensed with said sheet material as a film upon said one surface of said sheet material.

19. The product of claim 18 which comprises guide means for a second sheet material located adjacent one wall of said chamber and having a withdrawal passage substantially opposite the egress passage of said chamber and a second sheet material mounted within said guide means and extending through said withdrawal passage, said first sheet material also extending through said withdrawal passage with the surface thereof carrying the liquid film facing said second sheet material, said sheet materials being thus superposed with the liquid film therebetween as said sheet materials are withdrawn from said withdrawal passage.

20. The product of claim 18 wherein said sheet material has a second sealing strip attached thereto and spaced rearwardly from said first sealing strip whereby the egress passage of said product can be again sealed after a predetermined travel of said sheet material through said egress passage.

21. A composite product for dispensing a liquid-coated sheet material, said product comprising, in combination, a disposable housing providing a chamber for containing a liquid, means providing an ingress passage from the exterior of said housing into said chamber, means providing an egress passage from the interior of said chamber to the exterior of said housing, an elongated sheet material threaded through said passages so that a portion of the length of said sheet material is contained within said chamber, a leading portion of said sheet material projecting from said egress passage externally of said housing, a trailing portion of said sheet material projecting from said ingress passage, means within said chamber engaging the entire length of the portion of said sheet material in said chamber, said last-named means extending from said ingress passage to said egress passage and cooperating with said sheet material to guide said sheet material through said chamber and to render one of the two surfaces of said sheet material available for direct contact with liquid in said chamber while preventing such liquid from reaching the other of said surfaces, means forming a separate liquid-containing compartment within said chamber which excludes said sheet material and which is located in said chamber opposite said one surface of said sheet material, a liquid contained in said compartment, and means for opening said compartment to cause the liquid contained therein to be released for filling the portion of said chamber which includes said one surface whereupon said liquid directly contacts said one surface and withdrawal of said sheet material from said egress passage provides a film of said liquid on said one surface.

22. The product of claim 21 wherein said means for forming the separate liquid-containing compartment includes a rupturable membrane which provides one wall of said compartment and the means for releasing the liquid from said compartment comprises an element connected to said membrane and capable of rupturing said membrane when moved.

23. The product of claim 22 wherein said element for rupturing said membrane is connected to said sheet material so that movement of said sheet material automatically effects the rupture of said membrane.

24. The product of claim 21 which comprises guide means for a second sheet material located adjacent one wall of said chamber and having a withdrawal passage substantially opposite the egress passage of said chamber and a second sheet material mounted within said guide means and extending through said withdrawal passage, said first sheet material also extending through said withdrawal passage with the surface thereof carrying the liquid film facing said second sheet material, said sheet materials being thus superposed with the liquid film therebetween as said sheet materials are withdrawn from said withdrawal passage.

25. A composite product for dispensing a liquid-coated sheet material, said product comprising, in combination, a disposable housing providing a chamber for containing a liquid, means providing an ingress passage from the exterior of said housing into said chamber, means providing an egress passage from the interior of said chamber to the exterior of said housing, an elongated sheet material threaded through said passages so that a portion of the length of said sheet material is contained within said chamber, a leading portion of said sheet material projecting from said egress passage externally of said housing, a trailing portion of said sheet material projecting from said ingress passage, means within said chamber engaging the entire length of the portion of said sheet material in said chamber, said last-named means extending from said ingress passage to said egress passage and cooperating with said sheet material to guide said sheet material through said chamber and to render one of the two surfaces of said sheet material available for direct contact with liquid in said chamber while preventing such liquid from reaching the other of said surfaces, a liquid contained within said chamber and in direct contact with said one surface of said sheet material, a sealing element located in said egress passage for cooperation with the walls of said egress passage and said sheet material to provide a liquid-tight seal preventing the leakage of liquid from said chamber, said sealing element being removable from said egress passage and, upon removal, permitting a film of liquid to be formed on said sheet material as the latter is withdrawn from said egress passage, guide means for a second sheet material located adjacent one wall of said chamber and having a withdrawal passage substantially opposite the egress passage of said chamber and a second sheet material mounted within said guide means and extending through said withdrawal passage, said first sheet material also extending through said withdrawal passage with the surface thereof carrying the liquid film facing said second sheet material, said sheet materials being thus superposed with the liquid film therebetween as said sheet materials are withdrawn from said withdrawal passage.

EDWIN H. LAND.

References Cited in the file of this patent

UNITED STATES PATENTS

| Number | Name | Date |
|---|---|---|
| 57,764 | Pulte | Sept. 4, 1866 |
| 132,250 | Channel | Oct. 15, 1872 |
| 742,405 | Eichengrun | Oct. 27, 1903 |
| 1,077,835 | Kelly | Nov. 4, 1913 |
| 1,841,653 | Van der Grinten | Jan. 19, 1932 |
| 1,956,230 | Schmidt | Apr. 24, 1934 |
| 2,186,637 | Green | Jan. 9, 1940 |
| 2,208,106 | Schade | July 16, 1940 |
| 2,299,045 | Trump | Oct. 13, 1942 |
| 2,315,966 | Knott | Apr. 6, 1943 |
| 2,409,153 | Russell | Oct. 8, 1946 |
| 2,435,717 | Land | Feb. 10, 1948 |
| 2,435,720 | Land | Feb. 10, 1948 |
| 2,475,973 | Luboschez | July 12, 1949 |
| 2,499,017 | Callaway et al. | Feb. 28, 1950 |

FOREIGN PATENTS

| Number | Country | Date |
|---|---|---|
| 27,308 | Sweden | June 6, 1908 |
| 352,090 | Italy | Sept. 4, 1937 |
| 879,995 | France | Dec. 10, 1942 |